(12) United States Patent
Rosasco et al.

(10) Patent No.: US 8,488,906 B2
(45) Date of Patent: Jul. 16, 2013

(54) METHODS AND APPARATUSES FOR PIXEL TRANSFORMATIONS

(75) Inventors: John D. Rosasco, Santa Cruz, CA (US); John Stauffer, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/304,031

(22) Filed: Nov. 23, 2011

(65) Prior Publication Data

US 2012/0070076 A1 Mar. 22, 2012

Related U.S. Application Data

(62) Division of application No. 12/764,882, filed on Apr. 21, 2010, now Pat. No. 8,068,692, which is a division of application No. 11/362,254, filed on Feb. 24, 2006, now Pat. No. 7,706,629.

(51) Int. Cl.
*G06K 9/36* (2006.01)

(52) U.S. Cl.
USPC .......................................................... 382/276

(58) Field of Classification Search
USPC .................................. 345/603, 604; 382/276
See application file for complete search history.

(56) References Cited

U.S. PATENT DOCUMENTS

| | | | |
|---|---|---|---|
| 4,757,384 A | 7/1988 | Nonweiler et al. | |
| 5,081,594 A | 1/1992 | Horsley | |
| 5,193,012 A | 3/1993 | Schmidt | |
| 5,329,310 A | 7/1994 | Lilegren et al. | |
| 5,452,104 A | 9/1995 | Lee | |
| 5,475,803 A | 12/1995 | Stearns et al. | |
| 5,715,385 A | 2/1998 | Stearns et al. | |
| 5,912,984 A | 6/1999 | Michael et al. | |
| 6,292,168 B1 | 9/2001 | Venable et al. | |
| 6,348,976 B1 | 2/2002 | Hayashi | |
| 6,366,281 B1 | 4/2002 | Lipton et al. | |
| 6,412,112 B1 | 6/2002 | Barrett et al. | |
| 6,674,430 B1 | 1/2004 | Kaufman et al. | |
| 6,758,574 B1 | 7/2004 | Roberts | |
| 7,944,593 B2 | 5/2011 | Aschenbrenner et al. | |
| 2001/0037461 A1* | 11/2001 | Conrath | 713/201 |
| 2002/0016818 A1 | 2/2002 | Kirani et al. | |
| 2002/0057268 A1 | 5/2002 | Saib et al. | |
| 2003/0025921 A1 | 2/2003 | Delean | |

(Continued)

OTHER PUBLICATIONS

BitJazz SheerVideo Versatility, BitJaz Inc. [online], 2003, 2004 [Retrieved on Nov. 6, 2012] Retrieved from the Internet<URL:http://www.bitjazz.com/en/products/sheervideo/.*

(Continued)

*Primary Examiner* — Gregory F Cunningham
(74) *Attorney, Agent, or Firm* — Blakely, Sokoloff, Taylor & Zafman LLP

(57) ABSTRACT

Methods, apparatuses, systems, and machine readable media for pixel transformations. One exemplary method includes: determining a state of a pixel format transformation, wherein a pixel format includes a predetermined number of pixel data components and a predetermined number of bits for each of the pixel data components and wherein the state includes a source pixel format and a destination pixel format and at least one intermediate pixel format; converting pixel data in the source pixel format to pixel data in the intermediate pixel format; and converting the pixel data in the intermediate pixel format to pixel data in the destination pixel format. In certain embodiments, a method includes building and compiling a function, at run-time, for the pixel format transformation based upon the state.

18 Claims, 7 Drawing Sheets

U.S. PATENT DOCUMENTS

2004/0207622 A1* 10/2004 Deering et al. .............. 345/426
2005/0185091 A1* 8/2005 Tappermann et al. ........ 348/443
2006/0184783 A1 8/2006 Albert et al.

OTHER PUBLICATIONS

BitJazz SheerVideo Versatility, BitJaz Inc. [online], 2003, 2004 [Retrieved on Nov. 6, 2012] Retrieved from the Internet<URL:http://www.bitjazz.com/en/products/synchromy/.*

BitJazz SheerVideo Versatility, BitJaz Inc. [online], 2003, 2004 [Retrieved on Nov. 6, 2012] Retrieved from the Internet<URL:http://www.bitjazz.com/en/products/sheervideo/versatility/platforms.php.*

BitJazz SheerVideo Versatility, BitJaz Inc. [online], 2003, 2004 [Retrieved on Nov. 6, 2012] Retrieved from the Internet<URL:http://www.bitjazz.com/en/support/photojazz/developer_support/api_manual/file_layer/reading_files.php.*

BitJazz SheerVideo Versatility, BitJaz Inc. [online], 2003, 2004 [Retrieved on Nov. 6, 2012] Retrieved from the Internet<URL:http://www.bitjazz.com/en/products/sheervideo/faq/formats/pixel_formats.php.*

Bit Jazz SheerVideo Versatility, BitJaz Inc. [online], 2003, 2004 [Retrieved on Nov. 6, 2012] Retrieved from the Internet:://www.bitjazz.com/en/products/sheervideo/.*

Bit Jazz SheerVideo Versatility, BitJaz Inc. [online], 2003, 2004 [Retrieved on Nov. 11, 2012] Retrieved from the Internet:www.bitjazz.com/en/products/synchromy/.*

Bit Jazz SheerVideo Versatility, BitJaz Inc. [online], 2003, 2004 [Retrieved on Nov. 6, 2012] Retrieved from the internet:/www~bitjazz.com/en/products/sheervideo/versatity/p/atf/rms/php.*

Bit Jazz SheerVideo Versatility, BitJaz Inc. [online], 2003, 2004 [Retrieved on Nov. 6, 2012] Retrieved from the internet:www.bitjazz.com/en/support/photojazz/developer_support/api_manual/filelayer/reading_files.php.*

Aaron Sloman, "Compile-time as Run-time", [online], [retrieved on May 12, 2009]. Retrieved form the Internet:URL:http://www.poplog.org/talk/1993/msg00037.html.

* cited by examiner

METHODS AND APPARATUSES FOR PIXEL TRANSFORMATIONS

This application is a divisional of U.S. patent application Ser. No. 12/764,882, filed on Apr. 21, 2010 now U.S. Pat. No. 8,068,692, which is a divisional of U.S. patent application Ser. No. 11/362,254, filed on Feb. 24, 2006, now issued as U.S. Pat. No. 7,706,629.

BACKGROUND OF THE INVENTION

The present invention relates to data processing systems and methods for processing pixel data, such as pixel format transformations.

Pixel data is stored with varying representations of the data depending upon the device that is used to display the pixel data or the device that is used to acquire the pixel data. The devices used to acquire and to display pixel data typically vary by industry and/or scientific domain. The range of possible uses and the range of devices that use pixel data is very large.

Pixel data is maintained in some format. This format can include a number of components, such as color channels in the pixel data, the depth or number of bits per component, the order of the components, whether the data has a floating decimal point or a fixed decimal point, whether the data is signed or unsigned, etc.

An example of a typical pixel data format is pixel data in the RGB format with 8 bits per each of the color components (red, green and blue).

In order for pixel data to be exchanged between devices of different capabilities, pixel data is often transformed to a format that is amenable to the device that operates on it. For example, pixel data in an RGB format with 8 bits per color channel (8/8/8) may need to be transformed to pixel data in a BGR format having 4 bits per channel (4/4/4). The set of possible image transforms is proportional to the square of the number of possible formats (N) less the number of possible formats; in other words, the set of possible image transforms is equal to (N×N)−N. Conservatively speaking, there are 50 commonly used pixel formats and hence there are about 2,450 possible pixel format transforms.

Format transformations are only one common type of pixel processing. Consider that if other types of pixel transformation/modulations are done, it has a multiplying effect on the number of transformation modules that must be maintained. Examples of some common pixel transformation or modulation functions are scale and bias, multiplication by a color matrix, application of a lookup table, color space conversions and many others. Consider the addition of just one of these operations to pixel processing transformation: scaling the pixel values. To create an optimally performing module, without conditional testing (branching), one would need to create a module with scaling enabled and another one without. In this way, one could invoke the module that is tailored to the desired operation (the module with scaling, or the one without). In effect, the result of adding scaling as a feature of a system's pixel format transformation logic has created twice the number of modules to write and maintain. Add three more stages to this pixel processing, such as bias, color matrix, and a lookup table, and the number of branch free modules that would have to be maintained would be multiplied by 5. This combinitoric explosion scenario can be extended ad-infinitum for as many pixel transformations/modulation routines the user may wish to apply.

The logic required to transform and modulate pixels in one format to pixels in another format is different for each possible combination of input and output format and type of modulation. Building and maintaining a dedicated logical module for every possible transform and modulation requires a great deal of time and effort. A common solution which attempts to avoid this problem is to construct a module that iterates over the pixel data, and within each iteration, selects the input format, output format, and modulation logic to perform the transformation. This latter approach requires testing the format and modulation parameters to determine a logical path and then conditionally branching for each pixel processed in the loop. This conditional testing results in a great deal of overhead and stalling on modern computer processors. The first approach, which involves building individual custom transforms, has significantly better performance than the second approach, which includes conditional branching within the pixel data processing loop. However, because of all of the combinitoric state involved, building the individual custom transforms typically requires an enormous effort to develop and maintain this large number of functional modules.

SUMMARY OF THE DESCRIPTION

Methods, apparatuses and machine-readable media for processing pixel data formats are disclosed.

In one exemplary method, a state of a pixel format transformation is determined. This state includes a source pixel format and a destination pixel format and at least one intermediate pixel format. Data in the source pixel format is converted to pixel data in the intermediate pixel format, and then the pixel data in the intermediate pixel format is converted into pixel data in the destination format. Typically, a pixel format includes a predetermined number of pixel data components and a predetermined number of bits for each of the pixel data components. In at least certain embodiments of this method, the transformation is not a color space transformation and the source pixel format, the intermediate pixel format, and the destination pixel format are all in the same color space.

According to another aspect of the inventions described herein, an exemplary method includes determining, at run-time of an executing software process, a state of a pixel transformation from a pixel input data to a pixel output data and compiling, at the run-time, software operations to transform the pixel input data to an intermediate pixel data and to transform the intermediate pixel data to the pixel output data. In at least certain embodiments, the run-time compilation is performed by using source code which has been designed to implement a full set of transforms using at least one intermediate format. In at least certain embodiments, the intermediate format is selected to be lossless for both transforms from the pixel input data format to the intermediate format and transforms to the pixel output data format from the intermediate format. In at least certain embodiments, the result of the compilation (e.g. a particular pixel format transformation function) may be saved in cache for re-use for further pixel transformations of the same state (of a pixel transformation).

Another exemplary method described herein includes receiving, by a first software process, a call from a second software process to perform a pixel transformation and performing, by the first software process, the pixel transformation by converting from a first pixel input format provided by the second software process to an intermediate pixel format and converting from the intermediate pixel format to a first pixel output format. The first software process provides a first pixel output format to the second software process, which does not typically utilize the intermediate pixel format.

Other methods and apparatuses for performing these methods and machine-readable media for storing executable software instructions for performing these methods are also described herein.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Figure 1:
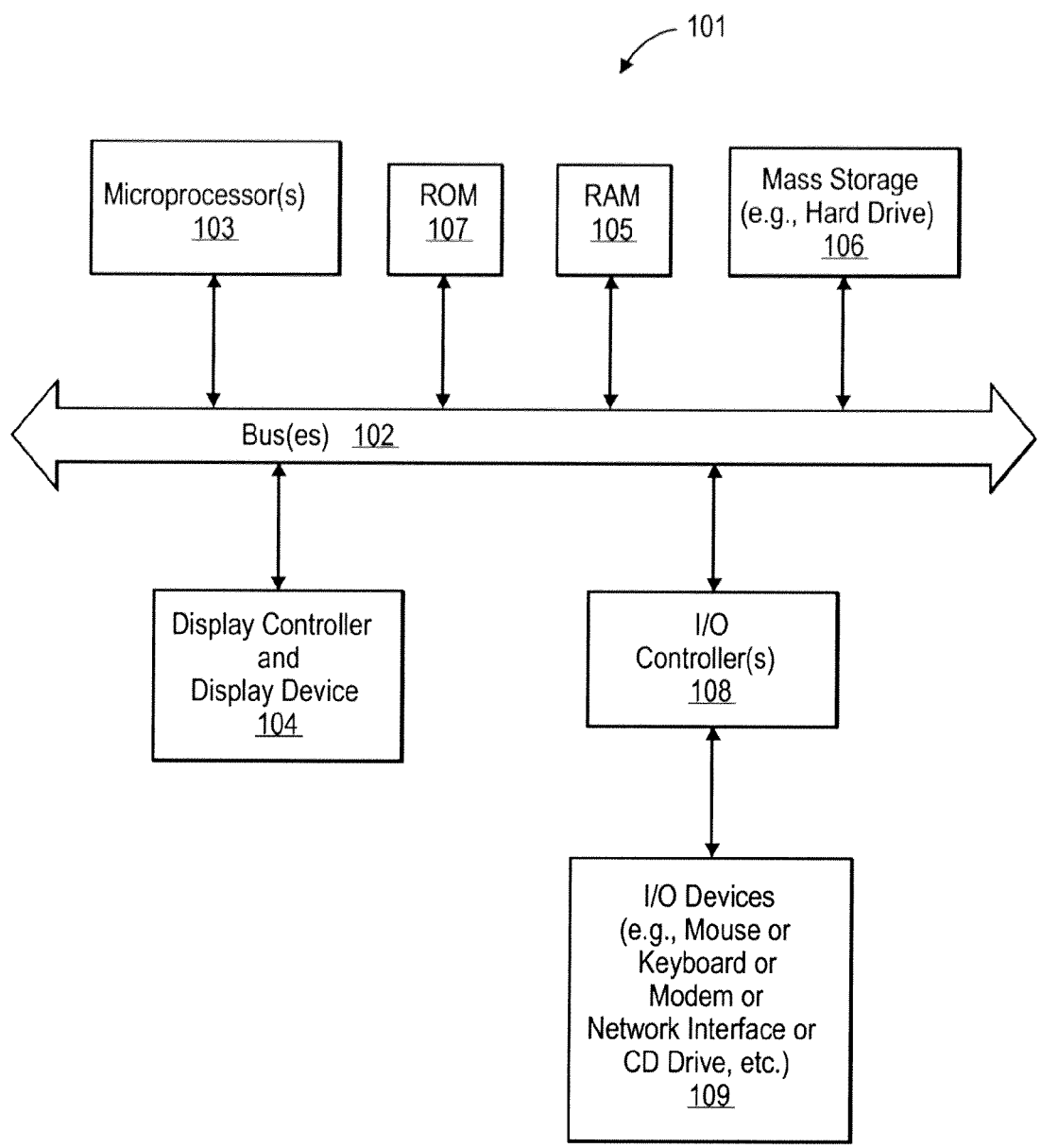
FIG. 1 shows in block diagram form a data processing system which may be used with one or more embodiments of the present inventions.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems (e.g. cellular telephones, personal digital assistants, video game systems, etc.) which have fewer components or perhaps more components may also be used with the present invention. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a G3 or G4 microprocessor from Motorola, Inc. or one or more G5 microprocessors from IBM or microprocessors from Intel. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. The display controller may include a GPU (graphics processing unit) which may perform a portion of or all of one or more of the methods described herein. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 2:
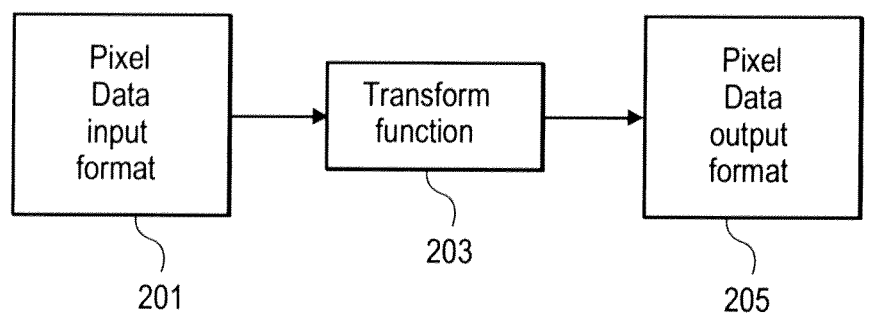
FIG. 2 depicts in block diagram form a general pixel data format transformation.
Figure 3:
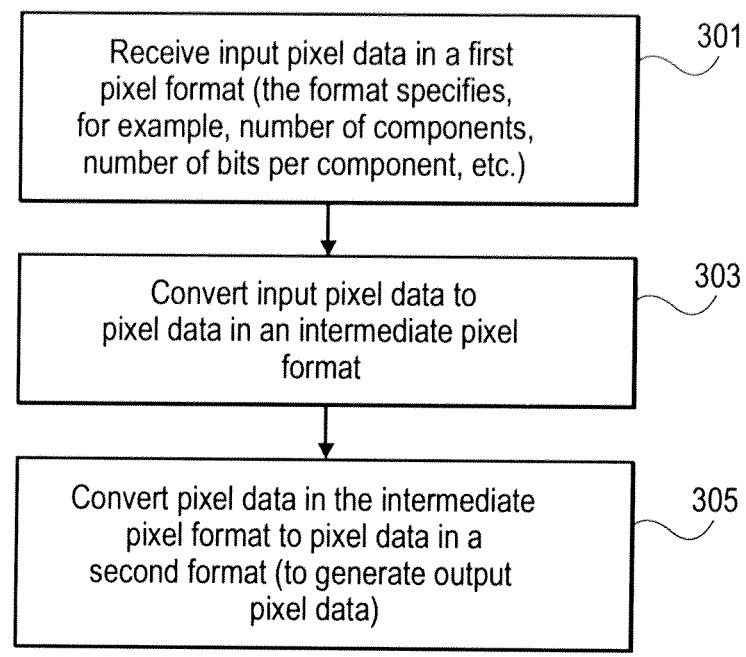
FIG. 3 is a flow chart which illustrates one exemplary method of the present invention.

A pixel format transformation typically involves the 3 components shown in FIG. 2. In particular, a transform function or logic 203 receives pixel data in an input format 201 and transforms that pixel data to pixel data in an output format 205. At least certain embodiments of the present inventions include the use of an intermediate pixel data format which is used by the transform function to perform the transformation. A general example of this method is shown in FIG. 3. In the method of FIG. 3, operation 301 receives input pixel data in a first pixel format, and this pixel data is then converted in operation 303 to pixel data in an intermediate pixel format. Then in operation 305, the pixel data in the intermediate pixel format is converted to pixel data in a second format which may be the output pixel data format. The format typically specifies, for example, the number of components, such as color channels, of the pixel data, the number of bits per component, and other parameters such as the order of the components (e.g. RGB vs. BGR), whether floating decimal point or fixed decimal point format is used, etc. In at least certain embodiments, the intermediate pixel format is selected such that the transformation between the input pixel format and the chosen intermediate format is lossless. There may be multiple different intermediate pixel formats which may be used by even the same input format. It will be appreciated that the method of FIG. 3 involves at least two conversions or transformations in pixel formats, unlike the prior art systems which include only a single transformation from the input format to the output format.

Figure 4:
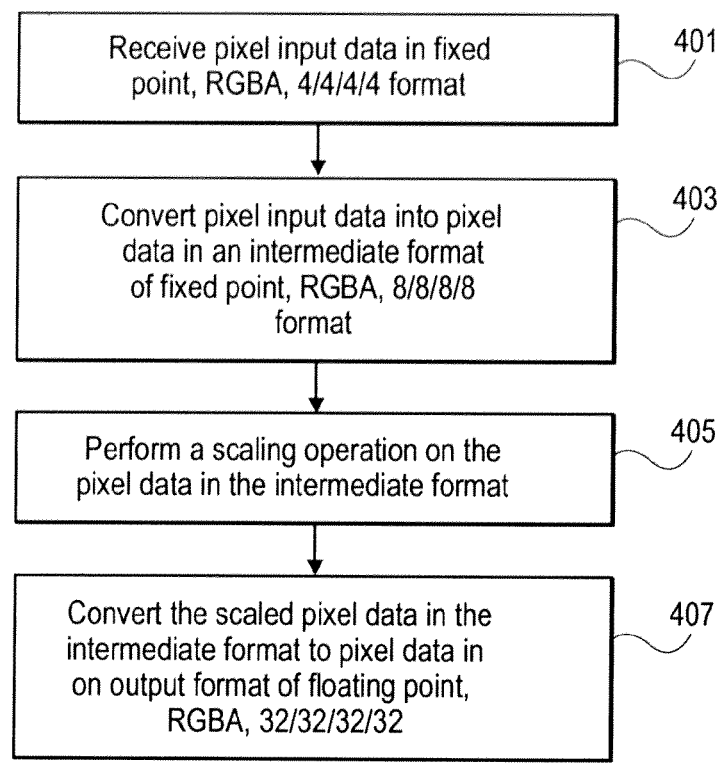
FIG. 4 shows a flow chart of a particular example according to one embodiment of the present invention.
Figure 5:
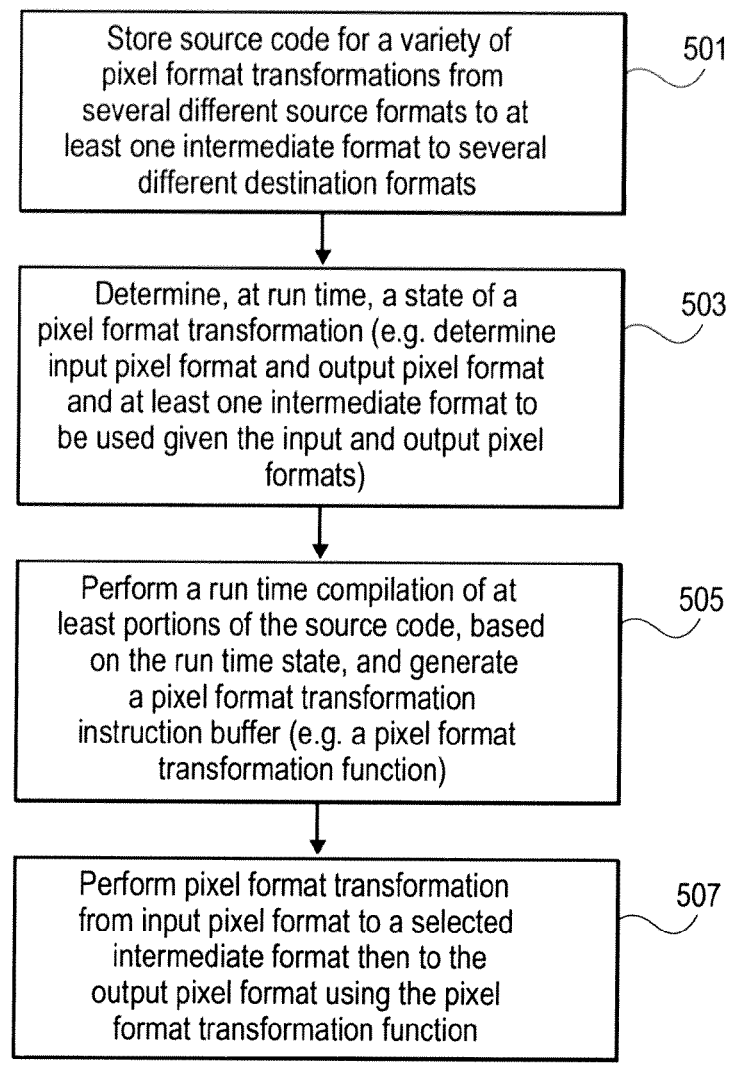
FIG. 5 is a flow chart which depicts another exemplary method of the present invention.

FIG. 4 shows a specific example of a method which utilizes an intermediate pixel format. The method of FIG. 4 also includes an additional operation, in this case a scaling operation, on the pixel data while it is in the intermediate format. The method of FIG. 4 begins in operation 401 in which pixel input data is received in an RGBA (red, green, blue, alpha) format having a fixed decimal point format with 4 bits for each component or channel. Then in operation 403, the pixel input data is converted into pixel data in an intermediate format having an RGBA format with 8 bits per channel and also being in a fixed decimal point format. In operation 405, a scaling operation is performed on the pixel data while in the intermediate format. Then the transformation process is completed in operation 407 by converting the scaled pixel data in the intermediate format to pixel data in an output format of RGBA, with 32 bits per channel and with a floating decimal point format. As with the example of FIG. 3, the intermediate format is typically selected such that there is no loss of data between the incoming pixel format and the chosen intermediate format, although in alternative embodiments, this transformation may be lossy. It will be appreciated that the logical or instruction buffer containing a transformation function may exist for each format pair with a corresponding intermediate format. In other words, for each possible input format and output format pair, an intermediate format is chosen and a transformation function is created for the particular format pair. It will be appreciated that, in at least certain embodiments, an intermediate format is selected based upon the particular input format and output format pair; in other words, a first intermediate format may be selected and used for a transformation between a first input/output format pair and a second intermediate format may be selected and used for a transmission between a second input/output format pair. A data processing system may create all of the logical or instruction buffers necessary to transform between all of the possible format pairs when the data processing system is initialized (e.g. upon boot-up); in this case, all of the necessary transform functions are created upon system initialization and are stored for possible use during the operation of the data processing system. However, in alternative embodiments, systems may be set up such that the logical or instruction buffers necessary for a particular transform function are created only at run-time when they are needed for a particular pixel format transformation. FIG. 5 shows an example of such a system or method.

Source code, in operation 501 of FIG. 5, is stored for a variety of pixel format transformations from several different source formats to at least one intermediate format and then to several different destination formats. This source code may contain all of the software necessary for creating pixel format transformation functions for all possible pixel format transforms for a given data processing system. For example, the source code may contain the necessary software for performing over 2,000 different pixel format transformations. The method of FIG. 5 continues in operation 503 in which it is determined, at run-time, a state of a pixel format transformation. This typically involves determining the input pixel format and the output pixel format and a particular selected intermediate format to be used for the given input and output pixel formats. As noted above, a particular input format and output format pair will often require the use of a particular intermediate format. In operation 505, the method performs a run-time compilation of at least portions of the source code, based on the run-time state. This compilation will generate a pixel format transformation instruction buffer which may be in the form of a pixel format transformation function, which includes in the function all stages of a pixel transformation, such as the stages shown in operation 707 in FIG. 7. Using the pixel format transformation instruction buffer compiled in operation 505, the system performs, in operation 507, the pixel format transformation from the input pixel format to a selected intermediate format and then to the output pixel format using the pixel format transformation function. It will be appreciated that the method of FIG. 5 may optionally check a cache for the existence of the required pixel format transformation instruction function before compiling the function in operation 505. The use of a cache is further described in relation to FIG. 6 below.

Operation 601 involves the determination of the pixel input and pixel output formats as well as modifications which occur to the pixels within the intermediate pixel format. Operation 601 also determines whether or not a pixel format transformation for the particular pixel input and output formats has already been created and stored in a cache. If it has been created and stored in a cache, then this preexisting pixel transformation function is used to perform the pixel format transformation and modifications; otherwise, if it is not available, then the processing continues with operation 603 which includes the compilation, at run-time of a software or process requesting the pixel transformation, of a pixel transformation instruction buffer from source code. This pixel transformation instruction buffer is then stored in a cache for future use. In operation 605, the pixel data in the pixel input format is converted to pixel data in the selected intermediate format. Then in operation 607, pixel modifying operations, such as scaling and/or biasing of the pixels while the pixel data is in the intermediate pixel data format, is performed. Then in operation 609, the pixel data in the intermediate pixel format is converted to pixel data in the pixel output format.

Figure 6:
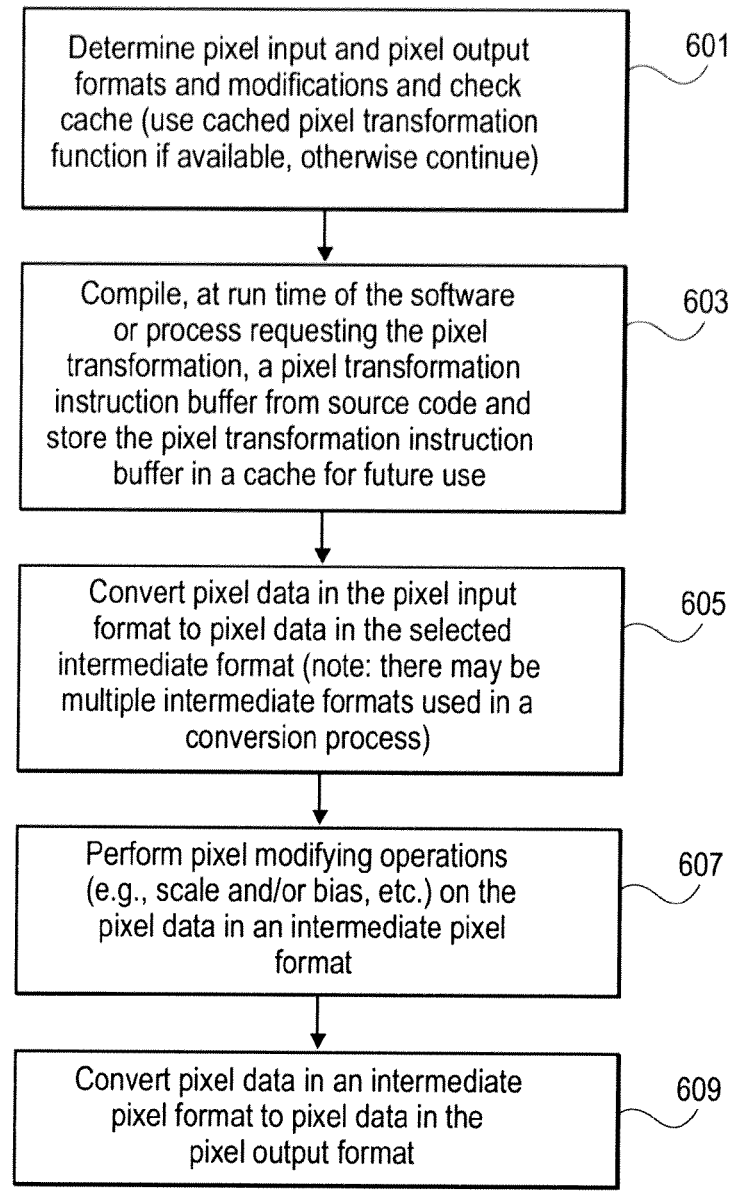
FIG. 6 shows a flow chart illustrating another exemplary method of the present invention.
Figure 7:
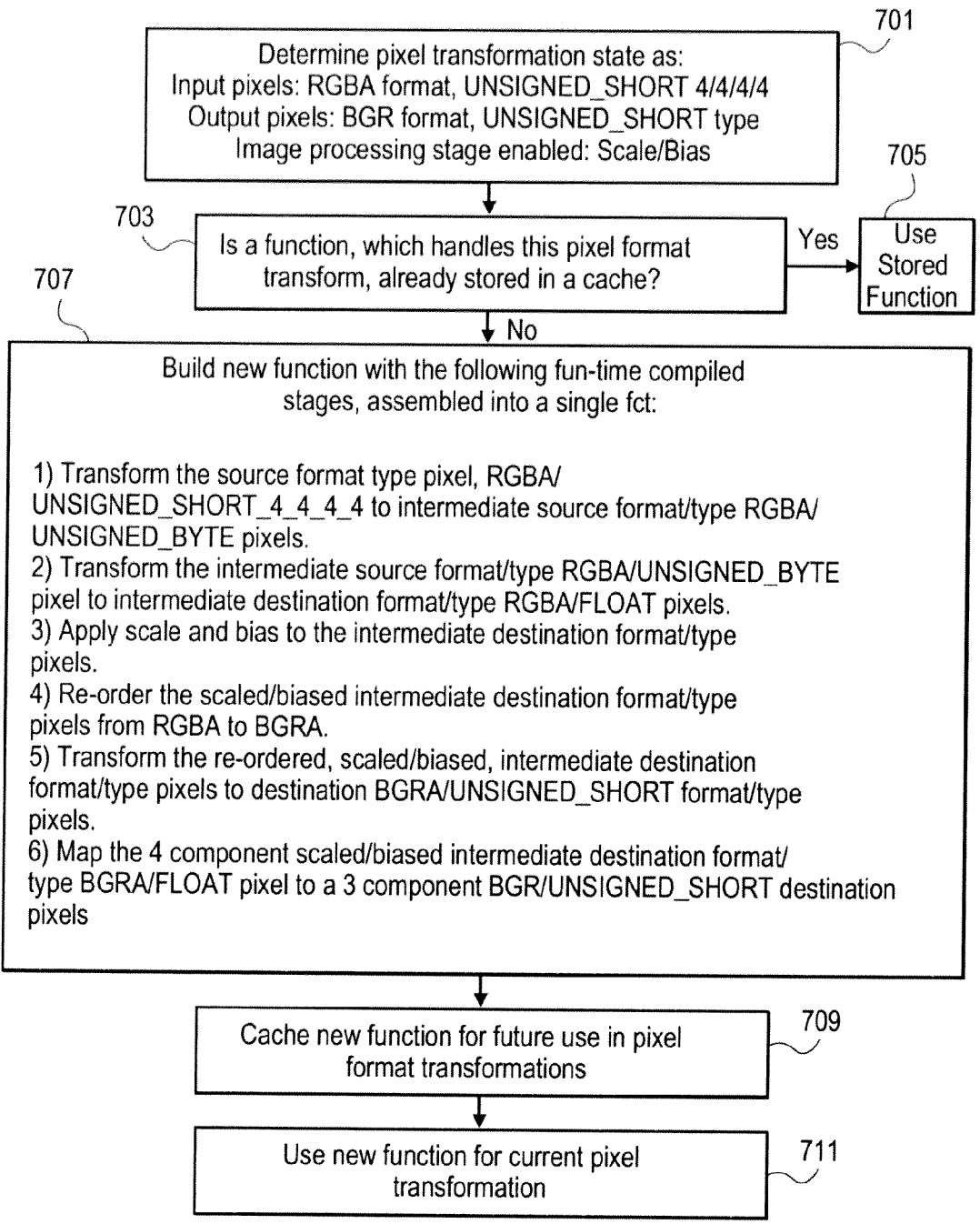
FIG. 7 shows a specific example according to one embodiment of the present invention.

FIG. 7 shows a specific example of a method which is similar to that shown in FIG. 6. The method of FIG. 7 assumes a specific input format and a specific output format for the pixel data as well as certain pixel modifying operations, such as scaling and biasing of the pixel data. Operation 701 involves the determination of the pixel transformation state as shown in FIG. 7. In particular, the input pixel data format is RGBA, UNSIGNED_SHORT_4_4_4_4. The output pixel format is BGR format, UNSIGNED_SHORT type. In operation 703, it is determined whether the pixel transformation function, which handles this particular pixel format transform, has already been stored in a cache. If it has, then processing in operation 703 utilizes the stored function without having to perform a compilation operation as in operation 707. If it has not already been stored, then the compilation operation 707 is performed by building a new pixel format transformation function with the run-time compiled stages shown in operation 707. These stages are assembled into a single function in order to perform a transformation from the source format, which is the format of the input pixel data to two different intermediate formats, where the final intermediate format is converted to the output format. The first intermediate format is designated as intermediate source format/type, and the second intermediate format is designated as intermediate destination format/type. This new function which was compiled in operation 707 is cached for future use in operation 709 and the new function is also used for the current pixel transformation in operation 711. It will be appreciated that the order of operations 711 and 709 may be reversed from what is shown in FIG. 7.

The use of intermediate pixel formats to perform pixel format transformations greatly reduces the complexity of the software which must be developed and maintained for the large variety of pixel transforms which exist.

With an intermediate pixel format chosen, the number of modules that must be developed and maintained is reduced from:

$$Tn = F \times ((N \times N) - N) \quad (1)$$

to:

$$Tn = ((Ni - I) \times I) + ((No - I) \times I)$$

where F is the number of pixel modulation stages (scale, bias, lookups, etc. . . . ), Ni is the number of input pixel formats, and No is the number of output pixel formats, and I is the number of intermediate formats. Typically, Ni=No so:

$$Tn = 2((N - I) \times I) \quad (2)$$

Note that I, the number of intermediate formats, is comparatively small relative to N, the number of possible formats. In one exemplary case, as cited earlier, N is approximately 50, and in this case, I is 2.

Pixel formats describe the number of components (e.g. RGB=3 components) and the size of each component (e.g. 8/8/8=8 bits for red, 8 bits for green, 8 bits for blue), and the ordering of the components (e.g. RGB=red, then green, then blue).

It is common when doing pixel format transforms to reorder the components. Using the method described above, re-ordering is efficiently done once the pixel data has been transformed into the intermediate format. A component mapping between the input pixel format and the output pixel format can be pre-determined and then applied to the intermediate pixel form to change the component ordering. This re-ordering logic adds one logical module to the formula above, or:

$$Tn = 2((N - I) \times I) + 1$$

Further, any number of pixel modification modules may be added and applied to the pixel while in its intermediate form without the combinatoric consequences of using prior art solutions. Typical pixel modifying functions such as scale, bias, lookup, etc. add one logical module per operation and are applied to the intermediate pixel form:

$$TN = 2((N - I) \times I) + F \quad (3)$$

where F is the number of pixel modifying functions applied to the intermediate pixel form.

A system architecture may be considered to be an aspect of at least some embodiments described herein. This system architecture uses a few intermediate pixel formats (e.g. 2 or 3 intermediate pixel formats) to perform a format transformation from a large number of input pixel formats (e.g. 40 or 50 or more input pixel formats) to another large number of output pixel formats (e.g. 40 or 50 or more output pixel formats). The total number of possible combinations of pixel format transformations, in such a system, will exceed 1000 or 1500 or 2000 or more (e.g., if the number of input formats is 40 and the number of output formats is 40, then this number of possible combinations is 40×40−40=1560). This system architecture provides a form of computational efficiency for the reasons described herein and effectively may be considered to implement a convergence, from many possible paths from a large number of source (input) formats to a large number of destination (output) formats, through a relatively small number of intermediate pixel formats. It can be seen that the ratio of the number of source or destination formats to the number of intermediate formats may be as high as 25 (=50÷2) or higher, and this ratio represents this convergence through the relatively small number of intermediate pixel formats. It will be appreciated that the pixel transformation, in this system architecture, effectively occurs as one operation which, to a user's perspective, appears to be an atomic operation in the sense that there is no ability for a user to interactively modify pixel data while it is in the intermediate pixel format. For example, a user cannot, in this system architecture, change pixel data when it is in any one of the intermediate formats. The pixel format transformation is effectively a predetermined function which is performed on the input pixel data without allowing the user to interact (e.g. change and observe the change) with the pixel data while it is in any one of the intermediate pixel formats. A particular predetermined pixel format transformation function is based upon a predetermined state of a pixel format transformation, which state is defined by a particular source pixel format and a particular destination pixel format, and the particular predetermined pixel format transformation function is designed to perform the transformation between the particular source pixel format and the particular destination pixel format using at least one intermediate pixel format. The pixel format transformation is often being done to convert pixel formats between devices in a data processing system, such as between an image scanner and a computer or between a computer and a display device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-readable non-transitory storage medium providing program instructions which when executed by a data processing system cause the data processing system to perform a method comprising:
   receiving a request for a pixel format transformation from a first input format to a first output format different from the first input format;
   performing the pixel format transformation through an intermediate format in a set of intermediate formats which include at least a first intermediate pixel format and a second intermediate pixel format, wherein the first input format is one of at least 40 different input formats, wherein the first output format is one of at least 40 different output formats, wherein the at least 40 different input formats are capable, through the program instructions, of being converted to at least one of the at least 40 different output formats, through the set of intermediate formats, wherein the at least 40 different output formats are capable, through the program instructions, of being converted from at least one of the at least 40 different input formats through the set of intermediate formats, and wherein the set of intermediate formats is much smaller than 40.

2. The medium as in claim 1 wherein the set of intermediate formats is less than 4 intermediate formats, and wherein the first intermediate pixel format is selected based on the first input format and the first output format.

3. The medium as in claim 1 wherein the pixel format transformation is not a color transformation and wherein the first input format and the first output format are in the same color space.

4. The medium as in claim 1 wherein the first input format and the first output format and the first and the second intermediate pixel formats are in the same color space.

5. The medium as in claim 4 wherein the method is performed by a function built at run-time of the pixel format transformation.

6. The medium as in claim 1, the method further comprising:
selecting one of the intermediate formats, in the set of intermediate formats, based on the first input format and the first output format;
using the selected intermediate format to perform the pixel format transformation.

7. The medium as in claim 6 wherein the pixel format further includes a first value specifying whether the pixel data components are either fixed or floating point values and a second value specifying whether the pixel data components are either signed or unsigned and wherein the pixel format includes a predetermined number of bits for each of the pixel data components.

8. A machine-readable non-transitory storage medium providing program instructions which when executed by a data processing system cause the data processing system to perform a method comprising:
receiving a request for a pixel format transformation from a first input format to a first output format;
performing the pixel format transformation through an intermediate format in a set of intermediate formats which include at least a first intermediate pixel format and a second intermediate pixel format, wherein the first input format is one of at least 40 input formats, wherein the first output format is one of at least 40 output formats, wherein the at least 40 input formats are capable, through the program instructions, of being converted to at least one of the at least 40 output formats through the set of intermediate formats, wherein the at least 40 output formats are capable, through the program instructions, of being converted from at least one of the at least 40 input formats through the set of intermediate formats, and wherein the set of intermediate formats is much smaller than 40;
selecting one of the intermediate formats, in the set of intermediate formats, based on the first input format and the first output format; and
using the selected intermediate format to perform the pixel format transformation, wherein a first software process requests, through a call, the pixel format transformation and specifies the first input format and the first output format but does not specify the selected intermediate format.

9. The medium as in claim 8 wherein the selected intermediate pixel format is selected to provide a lossless transformation from the first input format to the selected intermediate pixel format and to provide a lossless transformation from the selected intermediate pixel format to the first output format.

10. The medium as in claim 8 wherein a second software process receives the call from the first software process and wherein the second software process selects the selected intermediate format.

11. A data processing system comprising:
means for receiving a request for a pixel format transformation from a first input format to a first output format different from the first input format;
means for performing the pixel format transformation through an intermediate format in a set of intermediate formats which include at least a first intermediate pixel format and a second intermediate pixel format, wherein the first input format is one of at least 40 different input formats, wherein the first output format is one of at least 40 different output formats, wherein the at least 40 different input formats are capable, through the program instructions, of being converted to at least one of the at least 40 different output formats, through the set of intermediate formats, wherein the at least 40 different output formats are capable, through the program instructions, of being converted from at least one of the at least 40 different input formats through the set of intermediate formats, and wherein the set of intermediate formats is much smaller than 40.

12. The system as in claim 11 wherein the set of intermediate formats is less than 4 intermediate formats, and wherein the first intermediate pixel format is selected based on the first input format and the first output format.

13. The system as in claim 11 wherein the pixel format transformation is not a color transformation and wherein the first input format and the first output format are in the same color space.

14. The system as in claim 11 wherein the first input format and the first output format and the first and the second intermediate pixel formats are in the same color space.

15. The system as in claim 14 wherein the means for performing the pixel transformation includes a function built at run-time of the pixel format transformation.

16. The system as in claim 11, the means for performing the pixel transformation selects one of the intermediate formats, in the set of intermediate formats, based on the first input format and the first output format and uses the selected intermediate format to perform the pixel format transformation.

17. A data processing system comprising:
means for receiving a request for a pixel format transformation from a first input format to a first output format; and
means for performing the pixel format transformation through an intermediate format in a set of intermediate formats which include at least a first intermediate pixel format and a second intermediate pixel format, wherein the first input format is one of at least 40 input formats which are capable, through program instructions, of being converted from one of the at least 40 input formats through the set of intermediate formats which include the first intermediate pixel format, and wherein the first output format is one of at least 40 output formats which are capable, through the program instructions, of being converted to, through the set of intermediate formats, and wherein the set of intermediate formats is much smaller than 40,
wherein the means for performing the pixel transformation selects one of the intermediate formats, in the set of intermediate formats, based on the first input format and the first output format and uses the selected intermediate format to perform the pixel format transformation, and wherein a first software process requests, through a call, the pixel format transformation and specifies the first input format and the first output format but does not specify the selected intermediate format.

18. The system as in claim 17 wherein a second software process receives the call from the first software process and wherein the second software process selects the selected intermediate format.

* * * * *